April 22, 1924.  
C. E. JOHANSSON  
MEASURING SET FOR MEASURING ANGLES  
Filed Feb. 17, 1919  
1,490,927  
2 Sheets-Sheet 1
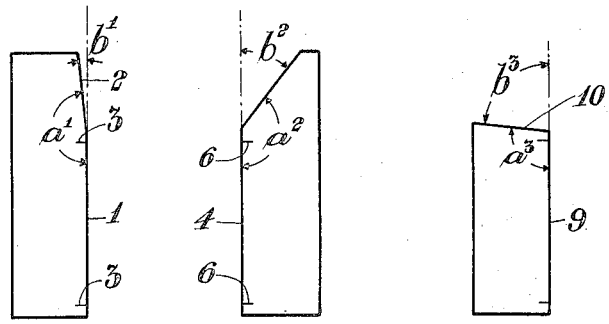
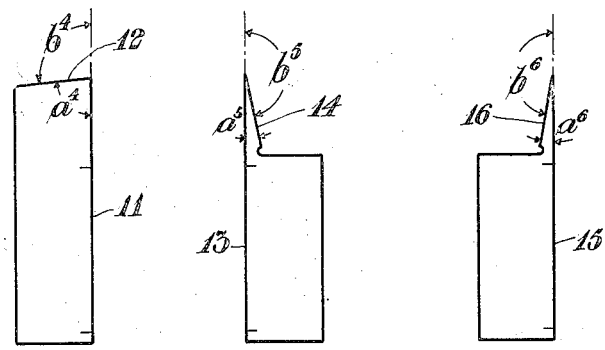
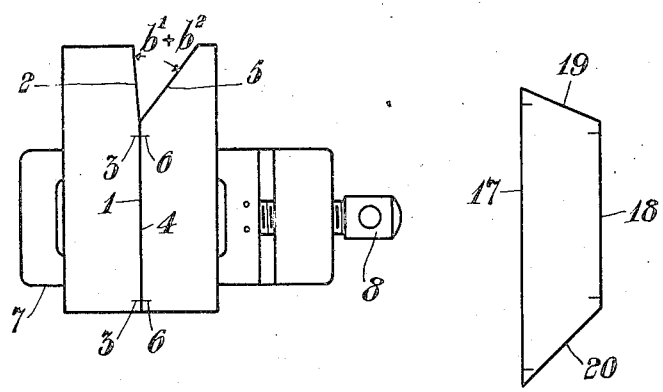
Inventor:  
Carl Edvard Johansson  
By George Bayard Jones  
Attorney.

April 22, 1924.
C. E. JOHANSSON
1,490,927
MEASURING SET FOR MEASURING ANGLES
Filed Feb. 17, 1919 2 Sheets-Sheet 2
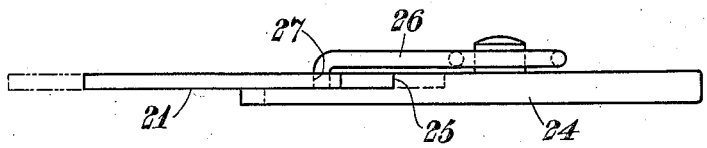
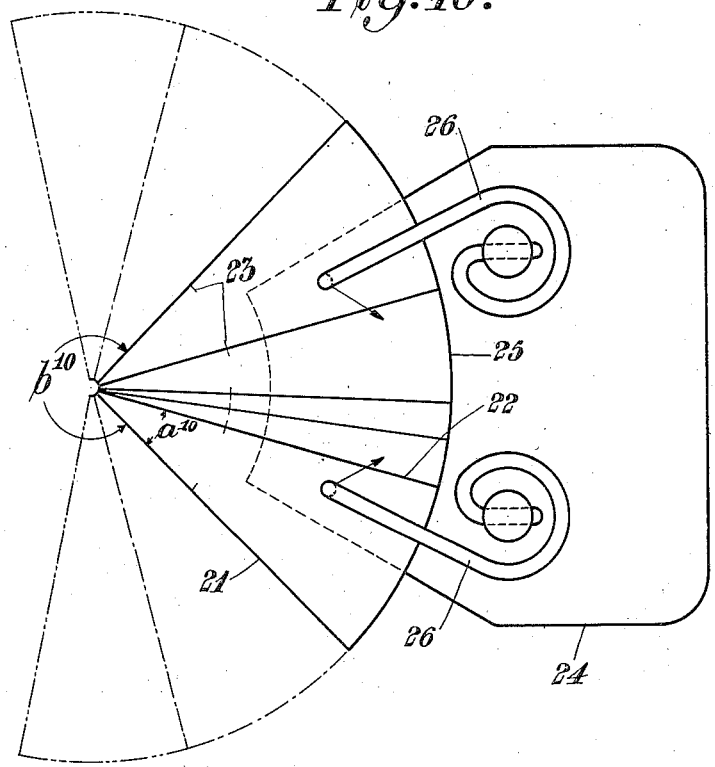
Inventor:
Carl Edvard Johansson
By George Bayard Jones
Attorney Patented Apr. 22, 1924.

1,490,927

UNITED STATES PATENT OFFICE.

CARL EDVARD JOHANSSON, OF ESKILSTUNA, SWEDEN, ASSIGNOR TO AKTIEBOLAGET C. E. JOHANSSON, OF ESKILSTUNA, SWEDEN, A COMPANY OF SWEDEN.

MEASURING SET FOR MEASURING ANGLES.

Application filed February 17, 1919. Serial No. 277,605.

*To all whom it may concern:*

Be it known that I, CARL EDVARD JOHANSSON, a subject of the King of Sweden, residing at Eskilstuna, in the Kingdom of Sweden, have invented a new and useful Improvement in Measuring Sets for Measuring Angles, of which the following is a specification.

For accurate measuring the inventor has previously constructed so-called normal measuring sets consisting, as is now well known, of a number of end measuring blocks that by placing together two or more blocks so constructed a considerably greater number of measurements may be obtained within a certain range of measurement than what is possible by using each of the different blocks by itself. Each block is provided with two accurately parallel surfaces ground accurately plane, the perpendicular distance between the said surfaces being the measure represented by the block. On account of their great practicability and their high degree of accuracy such measuring sets have found an ever increasing use in the mechanical engineering industry.

The present invention relates to a measuring set for measuring angles and has for its purpose to make it possible to apply to such measuring the same system with a plurality of blocks capable of being placed together. The invention is broadly characterized by this that each block is provided with at least two accurately plane surfaces forming a certain definite angle with one another, the said angle being of different size for the different blocks of the set. By this means it is possible by placing together two or more blocks in different combinations to obtain a great number of different angular measures. For obtaining systematic combinations the blocks of a set may suitably be arranged in several different series when the difference between the angles of the blocks in the same series should always be equal but different in the different series. The difference between the angles of a series may be for instance 1', in another 1°, and so forth. Whether the blocks are provided with two or with more plane surfaces and thus form one or more angular measures, they may either be adapted to be placed together only in pairs or into combinations of several blocks, in order to obtain the desired angular measure.

In the accompanying drawings a few embodiments of the invention are shown by way of example. Figs. 1 to 6 incl. show different blocks of an angular measuring set of which each block forms only one angular measure, and Fig. 7 shows an example of combining these blocks by twos. Fig. 8 shows a block provided with more than two plane surfaces and forming several different angular measures. Fig. 9 shows an edge view, and Fig. 10 a plan view of several blocks of another embodiment of an angular measuring set placed together of which each block forms only one definite angle.

Each of the blocks shown in Figs. 1 to 6 incl. has only two accurately plane surfaces forming a certain angle with one another, and only one of these plane surfaces on each block is adapted to abut and to stick to the corresponding plane surface on another block when the blocks are placed together. For the sake of brevity this surface, or if there are several surfaces, these surfaces are hereafter called bearing surfaces, the other plane surface or the other plane surfaces on each block being called measuring surfaces.

Fig. 1 shows a measuring block provided with a bearing surface 1 and with a measuring surface 2. The latter surface forms with the bearing surface 1 an angle $a^1$ the supplement of which is referenced $b^1$ in the figure. On the block there are two marks or lines 3 at the bearing surface 1 which lines serve to facilitate the placing together of the blocks. The block shown in Fig. 2 is provided in similar manner with a bearing surface 4 and with a measuring surface 5 forming with the surface 4 an angle $a^2$ with supplement $b^2$. Also in this case there are two lines 6 on the block for the purpose above mentioned.

If it is desired to produce an angular measuring set of blocks according to these two examples the following two series may be chosen. The first series consists for instance of 60 blocks according to Fig. 1, the angles $a^1$ of the different blocks of the series being of such size that the supplements $b^1$ which are to form portions of the angles to be measured, will vary between 0° 0′ and 0° 59′ with an increase of 1′ for each block. The other series consists of 91 blocks according to Fig. 2, the angles $a^2$ of the different blocks being chosen so large that the supplements $b^2$ will vary between 0° and 90° with an increase of 1° for each block. Each block is suitably stamped with the value of its supplement $b^1$ or $b^2$. By means of these two series of blocks it is obviously possible to obtain angles of any number of degrees and minutes up to 90°, that is to say, within the first quadrant of the circle. If it is desired, for instance, to form an angle of 37° 48′ it is only necessary to select from the first series, the minute series, the block the supplement $b^1$ of which is 48′, and from the other series, the degree series, the block the angle $b^2$ of which is 37°, after which said two blocks are caused to stick to one another with their bearing surfaces 1 and 4 so that the lines 3 and 6 come into alignment, as shown in Fig. 7. The lines 3 and 6 on all blocks belonging to a set must obviously be placed in such manner as to be at equal distances from the point of the angle between the bearing surface and the measuring surface. In order that the two blocks shall be positively retained in such mutual position they may suitably be inserted in a holder 7 with a tightening screw 8. The angle $b^1+b^2$ between the two measuring surfaces 2 and 5 now forms the desired angular measure or 37° 48′.

If it is desired to obtain angular measures within the second quadrant, 90°–180°, it is necessary to add a further series of blocks according to Fig. 3. The bearing surface 9 here forms with the measuring surface 10 an angle $a^3$ with supplement $b^3$ which latter varies between 89° 0′ and 89° 59′ with an increase of 1′ for each block of the series which also in this case comprises 60 blocks. The desired angles are obtained by the aid of this minute series and the degree series according to Fig. 2. An angle of, for instance, 126° 35′ is obtained by selecting from the minute series the block the angle $b^3$ of which is 89° 35′, and from the degree series the block the angle $b^2$ of which is 37°, so that the sum of said two angles $b^3$ and $b^2$ gives the desired angular measure, when the two blocks are placed together in the manner above described.

For obtaining angles within the third quadrant, 180°–270°, two series of blocks according to the constructional forms shown in Figs. 4 and 5 may be used. On the block shown in Fig. 4, which is supposed to belong to a minute series comprising 60 blocks, the bearing surface 11 forms with the measuring surface 12 an angle $a^4$ the supplement $b^4$ of which varies between 90° 0′ and 90° 59′ in this series. On the other hand, on the block according to Fig. 5, which belongs to a degree series comprising for instance 85 blocks, the bearing surface 13 forms with the measuring surface 14 the angle $a^5$ the supplement $b^5$ of which varies between 91° and 175°. It is to be observed that in this case it is not possible to attain 180°, because the surfaces 13 and 14 would then coincide. For obtaining a sufficient thickness of the material at the point its angle should not be made less than about 5°. It is then possible to obtain an angle of for instance 223° 52′ by selecting from the minute series a block the supplement $b^4$ of which is 90° 52′, and by placing this block in the manner above described against a block selected from the degree series and having an angle $b^5$ of 133°.

Finally, if it is desired to obtain angles also within the fourth quadrant, a further minute series is required consisting of 60 blocks of approximately the form illustrated in Fig. 6. According to this form the bearing surface 15 forms with the measuring surface 16 an angle $a^6$ the supplement $b^6$ of which varies between 174° 0′ and 174° 59′. For the reason above stated it is also in this case impossible to go closer to 180° than about 5°. By the aid of this minute series and the degree series according to Fig. 5 it is thus possible to obtain angles up to about 350°. Thus an angle of, for instance, 347° 55′ is obtained by selecting from the minute series according to Fig. 6 the block the supplement $b^6$ of which is 174° 55′, and from the degree series according to Fig. 5 the block with the supplement $b^5$ equal to 173°.

It will be understood from the above description that a complete measuring set for angular measures within all four quadrants, comprising blocks according to the forms shown in Figs. 1 to 6 incl. in which each block forms only one angular measure, will comprise a comparatively great number of blocks. In practice, however, the number of blocks may easily be considerably reduced without reducing the number of different angular measures which may be obtained by means of the same. In the first place, the blocks of the minute series according to Fig. 4 may obviously be replaced by corresponding blocks according to Fig. 3, or vice versa, so that one of said two series may be omitted, the only difference between said two series being that all angles $a^4$ in the first named series are one degree less than the angles $a^3$ of the last named series. A more substantial reduction of the number of blocks, however, may be obtained by providing each block with more than two plane surfaces so that it forms two or even more different angles. Thus the blocks shown in Figs. 1 to 6 incl. may be altered, for instance, in such manner that also their lower surfaces, which border against the lower edges of the bearing surfaces 1, 4, 9, and so forth, are made as measuring surfaces forming with the bearing surfaces other angles than the upper measuring surfaces. In this manner the necessary number of blocks will be reduced by one-half. Each block will thus have three plane surfaces, but only one of these surfaces serves as bearing surface. It is also possible, however, to provide two opposite bearing surfaces on each block and in this manner to obtain still more different angles. Such a block is shown by way of example in Fig. 8. This block is provided with two parallel bearing surfaces 17 and 18, and with two measuring surfaces 19 and 20 forming with the two bearing surfaces four angles of different sizes, so that one such block may take the place of four different blocks according to the forms shown in Figs. 1 to 6 incl.

In all embodiments above described the blocks are adapted to be placed together only in pairs, so that the desired angular measure is thus obtained by the sum of two supplements. In the embodiment shown in Figs. 9 and 10, on the other hand, the blocks are adapted to be placed together in combinations generally comprising more than two blocks, for obtaining the desired angular measure. Each block has the shape of a sector of a circle, and is provided with only two accurately plane surfaces 21 and 22 forming with one another the definite angle $a^{10}$ at the centre of the circle, the third surface opposite the point of the angle forming a portion of the surface of a cylinder having equal radius of curvature for all blocks belonging to the same set. The surfaces 21 and 22 alternately serve as bearing surfaces and as measuring surfaces, depending upon what place the block occupies in the combination, only the two surfaces directed outwards on the two outer blocks in the combination forming measuring surfaces while all other plane surfaces form bearing surfaces. Also in this case the blocks should be provided with lines 23 at the bearing surfaces for facilitating the placing together of the blocks.

As will be understood from Fig. 10, the desired angular measure $b^{10}$ is in this case equal to the difference between 360° and the sum of all angles $a^{10}$ of all blocks in the combination. The combinations according to this embodiment generally comprising more than two blocks it is possible to select the series in such manner that the desired angular measures are obtained from a comparatively small number of blocks. For instance, two minute series may thus be provided, one of which consists of 9 blocks the angles 10 of which vary between 5° 1' and 5° 9' with an increase of 1' for each block, and the other series comprising 5 blocks the angles of which vary between 5° 10' and 5° 50' with an increase of 10' for each block. By placing together one block of each of said two series any number of minutes between 1' and 59' may thus be obtained. Similarly, two degree series are provided, the first of which consists, for instance, of 25 blocks the angles $a^{10}$ of which vary between 5° and 29° with an increase of 1° for each block, and the other series consisting of 6 blocks the angles of which vary between 30° and 180° with an increase of 30° for each block.

By means of these four series, comprising together 45 blocks, it is possible to obtain any desired angular measure $b^{10}$ between 0° and 345°. Even the smallest blocks being required to possess a certain thickness, it is also in this case impossible to attain 360°, which fact, however, is thought to be of minor importance in practice. If it is desired to obtain an angular measure $b^{10}$ of for instance 2° 5', the blocks comprised in the combination should be selected so that the sum of their angles $a^{10}$ is 357° 55'. From the first minute series the block 5° 5' is selected, from the second minute series the block 5° 50', from the first degree series the block 17°, and from the second degree series the two blocks 150° and 180°, and by placing said five blocks together the desired sum 357° 55' is obtained. In this case the blocks should preferably be stamped with their actual angular measures.

In order to retain the blocks placed together in proper position a holder of the kind shown in Figs. 9 and 10 may suitably be used. It consists of a plate 24 provided with an arc-shaped recess forming in the plate an edge 25 the radius of curvature of which is equal to the radius of the cylindrical surface of the blocks. Two springs 26 are secured to the plate, the free ends of said springs forcing the blocks placed in the recess of the plate inwards towards one another and against the arc-shaped edge 25, i. e. in the directions indicated by the arrows in Fig. 10. The large blocks which should always be placed outermost, are suitably provided with holes 27 into which the free ends directed downwards of the springs 26 may be introduced, as shown in Fig. 9.

Also the constructional form last described may be modified in several ways without departing from the principle of the invention.

I claim:

1. A measuring set for measuring angles, consisting of a plurality of independent blocks, each block being provided with at least two accurate plane surfaces forming a certain definite angle with one another, said angle having a different size for different blocks of the set, so that by placing together different blocks, each with one of its plane surfaces in contact with a corresponding surface of another block, different angles may be formed between the adjacent diverging plane surfaces according to the blocks selected.

2. Means for determining angular measurements, comprising a series of blocks each having a pair of faces forming a predetermined angle, the angular distance between said faces increasing progressively throughout the series by uniform increments.

3. Means for determining angular measurements, comprising a plurality of series of blocks, each block having a pair of faces forming a predetermined angle, the angular distance between said faces increasing progressively throughout each series by uniform increments, said increments being different in the several series.

4. In a measuring set, a series of blocks each having a plane surface and a second surface bearing a predetermined non-parallel relation thereto, the relation of said surfaces varying uniformly between said blocks throughout the series.

5. Measuring means comprising a plurality of series of blocks, each block having a plane surface and a second surface bearing a predetermined non-parallel relation thereto, the relation of said surfaces varying uniformly between said blocks throughout each series, the relation of the surfaces of the blocks being different in the several series.

6. In a measuring set, a series of blocks each having adjoining surfaces forming a predetermined outline, the outline of said blocks varying uniformly throughout the series.

7. Measuring means comprising a plurality of series of blocks, each block having adjoining surfaces forming a predetermined outline, the outline of said blocks varying uniformly throughout the series, the variance between said blocks being different in the several series.

CARL EDVARD JOHANSSON.